July 22, 1924.

C. D. STROMGREN

PISTON RING

Filed Aug. 11, 1919

1,502,445

Inventor
Charles Delbert Stromgren
by Graham & Clauн
Attorneys

Patented July 22, 1924.

1,502,445

UNITED STATES PATENT OFFICE.

CHARLES DELBERT STROMGREN, OF LOS ANGELES, CALIFORNIA.

PISTON RING.

Application filed August 11, 1919. Serial No. 316,889.

*To all whom it may concern:*

Be it known that I, CHARLES DELBERT STROMGREN, a citizen of the United States, residing at Los Angeles, in the county of Los Angeles and State of California, have invented a new and useful Piston Ring, of which the following is a specification.

My invention relates to piston rings of the class commonly used on the pistons of internal combustion and steam engines, being more particularly designed for use on the pistons of internal combustion engines and having for its primary purpose the prevention of the passage of lubricating oil past the piston into the combustion chamber of the engine between the head of the piston and the head of the cylinder in which the piston moves.

Piston rings ordinarily are used or constructed by placing a groove in the piston and fitting a cast iron ring in such groove so that the ring will exert a pressure against the cylinder wall of the engine. It is also known that the larger the area of an oil film the greater the load it will sustain, and in the design of piston rings I deem this one of the governing factors relative to maintaining a tight joint between the piston and the cylinder. In the present type of piston rings the ring is usually of the same width as the groove in the piston and has considerable spring tension, as such tension is necessary since the oil must be compressed to the thinnest possible film. In such construction there results considerable friction between the ring and the cylinder wall, and the prevention of the passage of oil into the combustion chamber is not accomplished.

In order to bring about the closest possible contact between the piston and the cylinder wall I have designed a piston ring the contact surface of which is of a fractional area of approximately one-half of the rings ordinarily used, such ring when engaging the wall of the cylinder having a greater tendency, with the same amount of spring in the ring or even with less spring, to compress the smaller film of oil down to a minimum thickness, and the principal object of my invention is to produce a piston ring of the usual width to fit the grooves of the pistons as made at the present time, such ring having a smaller bearing surface for engaging the cylinder wall so that a very small film of oil needs to be compressed by the ring and such ring having a smaller diametered part which together with the side wall of the groove in the piston forms a recess which is in direct communication with the film of oil on the cylinder for receiving the oil removed from the cylinder wall by the piston ring due to the particular construction of the piston ring relative to its flanges.

A further object of my invention is to provide means whereby the oil removed from the cylinder wall by the piston ring may be readily discharged into the crank case of the engine, at the same time maintaining compression.

Other objects and advantages will appear hereinafter from the following specification.

Referring to the drawings, which are for illustrative purposes only,

Figure 1:
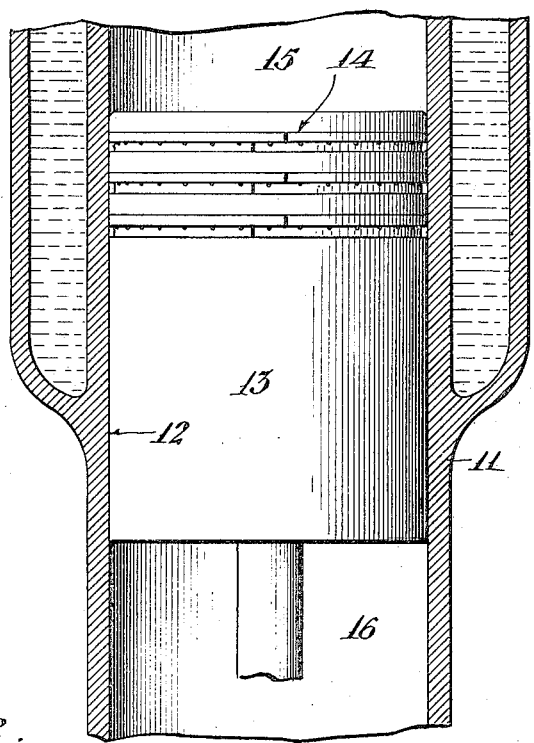
Fig. 1 is a vertical sectional view of a portion of a cylinder, a piston being shown therein equipped with piston rings embodying a form of my invention.

11 designates a portion of the cylinder of an internal combustion engine, 12 the inner wall or bore of the cylinder, and 13 a piston in the cylinder, such piston having a series or plurality of ring grooves 14, it being understood that the portion of the cylinder indicated at 15 above the piston is the combustion chamber and the portion 16 below the piston indicates the crank case of the engine.

The grooves 14 in the piston are of common form and construction, being provided, however, with perforations 17 which extend from the bottom of the grooves 14 radially through the wall 18 of the piston to the interior of the same. In each groove 14 is placed a piston ring 19, the body 20 of the ring fitting within the grooves and the upper portion of the ring having an outwardly extending flange 21 which extends outwardly from the body of the ring and engages the inner wall 12 of the cylinder, such flange being of approximately half or less than half of the width of the ring, such ring, it being understood, being made of cast iron or other suitable material and being split as indicated at 22. The flange 21 forms a shoulder 23 on the ring, which, together with the lower wall 24 of the groove in the piston, forms a circular recess 25 for the purpose hereinafter described. The back of the ring is provided with a groove 26 which communicates with the recess 25 through radially disposed perforations 27 which extend slightly upwardly from the recess to the groove 26. This construction gives extra oil space under the ring without varying the ordinary groove construction commonly used so that my ring is constructed to be used in the ordinary piston ring groove.

Figure 2:
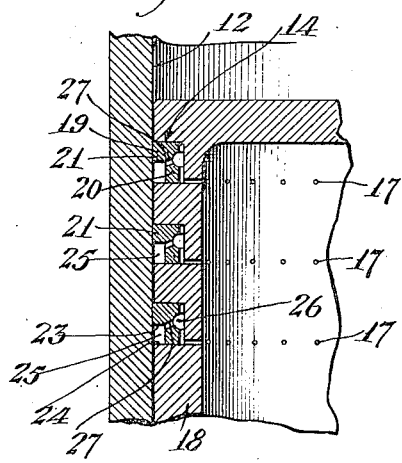
Fig. 2 is an enlarged vertical sectional view of a portion of the piston and cylinder wall, such piston having rings therein embodying a form of my invention shown in Fig. 1.
Figure 3:
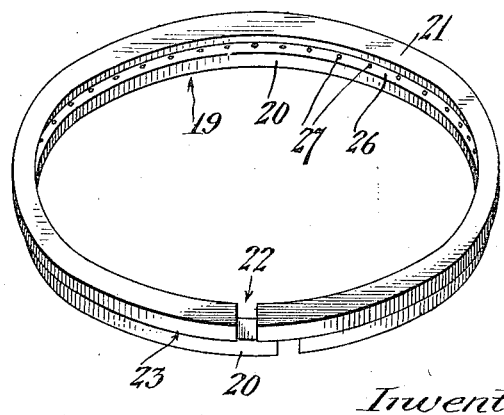
Fig. 3 is a perspective view of the piston ring shown in the preceding figure.

The rings when placed in the piston generally assume the position shown in Figs. 1 and 2, a slight space remaining between the back of the ring and the bottom of the groove in the piston.

The ring operates in the following manner:

As above indicated, by constructing the ring having a body portion with a flange extending outwardly to engage the walls of the cylinder, such flange being considerably less than the width of the ring, the film of oil on the wall of the cylinder to be compressed by such flange is relatively small in comparison with the rings ordinarily in use, a much thinner film of oil being thereby formed between the flange and the cylinder wall.

As the piston moves downwardly the shoulder 23 on each ring formed by the flange removes the excess oil from the wall of the cylinder, collecting the same in the recess 25, and when such recess has become full the oil so collected overflows through the perforations 27 to the groove 26 in the back of the ring and the space between the ring and the bottom of the groove in the piston. The oil so collected behind the ring is discharged into the crank case through the perforations 17 in the piston.

By the use of a ring of such construction as above described, the passage of lubricating oil into the piston chamber is reduced to a minimum, and it is to be noted that a ring constructed as above described may be used to replace the ordinary rings now in use as the body of the ring is of the same width as the ring ordinarily used.

I claim as my invention:

1. A piston ring for internal combustion engines comprising a ring having a body portion arranged to slidably engage the opposite walls of a groove in the piston, and a flange formed on the upper end of said body portion extending outwardly therefrom arranged to engage the wall of the cylinder, said body portion having perforations directly under the flange extending through the body portion to a point on the inside of the ring above the lower face of the ring.

2. A piston ring comprising a ring having a body portion and a flange formed on the upper end of said body portion, extending outwardly therefrom arranged to engage the wall of the cylinder and form a single circular contact between the ring and the walls of the cylinder, said body portion having a circular groove formed in the inner side thereof and said body portion having a plurality of perforations extending therethrough under said flange to the groove on the inner side of the ring.

3. In combination with an annular groove in a piston, a ring for said groove having a body portion fitting between the side walls of said groove, and a flange formed on said ring at the upper end thereof extending outwardly to engage the walls of the cylinder and form a single circular contact between the ring and the walls of the cylinder, said body portion having a circular groove formed in the inner side thereof and said body portion having a plurality of perforations extending therethrough under said flange to the groove on the inner side of the ring, said piston having perforations therein connecting the groove in the piston to the inner side of the piston.

4. In combination with an annular groove in an internal combustion engine piston, a ring for said groove having a body portion slidably fitting against the side walls of said groove, and a flange formed on said ring at the upper end thereof extending outwardly to engage the walls of the cylinder, said body portion having a plurality of perforations extending therethrough directly under said flange to the inner side of the ring above the bottom of the ring, said piston having perforations therein connecting the groove in the piston to the inner side of the piston.

5. A piston ring comprising a self expanding split ring having a body portion adapted to slidably fit the ordinary ring groove of a piston, and a circular flange formed on the upper part of said body portion forming a reduced portion of the ring for engagement with the walls of the cylinder and forming an oil collection chamber thereunder, said body portion having oil passages formed therein below the flange to relieve the oil collection chamber.

6. A ring as characterized, having annular grooves in the outer and inner surfaces thereof; passages communicating between the same; and means for draining the inner groove.

In testimony whereof, I have hereunto set my hand at Los Angeles, California, this 6th day of August, 1919.

CHARLES DELBERT STROMGREN.